(12) United States Patent
Ogumi et al.

(10) Patent No.: US 9,196,907 B2
(45) Date of Patent: Nov. 24, 2015

(54) AIR ELECTRODE FOR METAL-AIR BATTERY, MEMBRANE/AIR ELECTRODE ASSEMBLY FOR A METAL-AIR BATTERY HAVING SUCH AIR ELECTRODE, AND METAL-AIR BATTERY

(75) Inventors: Zempachi Ogumi, Kyoto (JP); Kohei Miyazaki, Kyoto (JP); Koji Nishio, Kyoto (JP); Yukinari Kotani, Gotenba (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 128 days.

(21) Appl. No.: 13/881,931

(22) PCT Filed: Oct. 28, 2011

(86) PCT No.: PCT/IB2011/002548
§ 371 (c)(1),
(2), (4) Date: Jun. 17, 2013

(87) PCT Pub. No.: WO2012/056301
PCT Pub. Date: May 3, 2012

(65) Prior Publication Data
US 2013/0273442 A1    Oct. 17, 2013

(30) Foreign Application Priority Data

Oct. 29, 2010   (JP) ................................ 2010-244118

(51) Int. Cl.
| H01M 4/36 | (2006.01) |
| H01M 4/90 | (2006.01) |
| H01M 4/86 | (2006.01) |
| H01M 12/08 | (2006.01) |

(52) U.S. Cl.
CPC .......... *H01M 4/9041* (2013.01); *H01M 4/8652* (2013.01); *H01M 4/8657* (2013.01); *H01M 4/9016* (2013.01); *H01M 4/9033* (2013.01); *H01M 12/08* (2013.01); *Y02E 60/50* (2013.01)

(58) Field of Classification Search
CPC . H01M 4/8652; H01M 4/9033; H01M 12/08; Y02E 60/50
See application file for complete search history.

(56) References Cited

U.S. PATENT DOCUMENTS

| 5,356,728 A | 10/1994 | Balachandran et al. |
| 6,127,061 A | 10/2000 | Shun et al. |
| 2002/0015871 A1 | 2/2002 | Tao et al. |
| 2004/0137310 A1 | 7/2004 | Kiros |

(Continued)

FOREIGN PATENT DOCUMENTS

| CN | 1338125 A | 2/2002 |
| CN | 102792500 A | 11/2012 |
| JP | A-2009-283381 | 12/2009 |
| JP | A-2010-108904 | 5/2010 |
| JP | A-2010-113889 | 5/2010 |

(Continued)

OTHER PUBLICATIONS

Liao et al. (Electrochim. Acta 49 (2004) 4993-4998).*

(Continued)

*Primary Examiner* — Ula C Ruddock
*Assistant Examiner* — Lisa S Park Gehrke
(74) *Attorney, Agent, or Firm* — Oliff PLC (57) ABSTRACT

An air electrode (6) for a metal-air battery includes an air electrode catalyst, an electrolyte for air electrodes and a; conductive material. The electrolyte for air electrodes contains a layered double hydroxide.

14 Claims, 4 Drawing Sheets

(56) References Cited

U.S. PATENT DOCUMENTS

| | | | |
|---|---|---|---|
| 2007/0141431 | A1 | 6/2007 | Wang et al. |
| 2009/0290287 | A1* | 11/2009 | Lipka et al. ............... 361/502 |
| 2011/0027666 | A1* | 2/2011 | Burchardt et al. ........... 429/406 |
| 2011/0183201 | A1 | 7/2011 | Genin et al. |
| 2013/0095323 | A1 | 4/2013 | Grafov et al. |
| 2013/0143132 | A1 | 6/2013 | Mizuno |
| 2013/0273442 | A1 | 10/2013 | Ogumi et al. |

FOREIGN PATENT DOCUMENTS

| | | |
|---|---|---|
| WO | WO 2010/012951 A2 | 2/2010 |
| WO | WO 2011/107667 A1 | 9/2011 |
| WO | WO 2012/023013 A1 | 2/2012 |

OTHER PUBLICATIONS

Sasaki et al. (J. Amer. Chem. Soc. 2006, 128, 4872-4880).*

Leroux et al. (Chem. Mater. 2001, 13, 3507-3515).*

Office Action issued in U.S. Appl. No. 13/581,383 issued Jul. 11, 2014.

Ngala et al., "Characterization and Electrocatalytic Behavior of Layered $Li_2MnO_3$ and Its Acid-Treated Form", *Chemistry of Materials*, 2007, vol. 19, pp. 229-234.

Office Action in U.S. Appl. No. 13/581,383 issued Jan. 16, 2014.

Iyi et al., "A Novel Synthetic Route to Layered Double Hydroxides Using Hexamethylenetetramine," Chemistry Letters, 2004, vol. 33, No. 9, pp. 1122-1123.

Naoko Fujiwara, "Development of Reversible Air Electrode for Metal-Air Secondary Battery," Electrochemistry, Jun. 5, 2010, vol. 78, No. 6, pp. 540-544.

Aug. 6, 2012 Partial Translation of Notification of Reason(s) for Refusal issued in Japanese Application No. 2010-244118.

Oct. 23, 2014 Advisory Action issued in U.S. Appl. No. 13/581,383.

Mar. 25, 2015 Notice of Allowance issued in U.S. Appl. No. 13/581,383.

* cited by examiner

AIR ELECTRODE FOR METAL-AIR BATTERY, MEMBRANE/AIR ELECTRODE ASSEMBLY FOR A METAL-AIR BATTERY HAVING SUCH AIR ELECTRODE, AND METAL-AIR BATTERY

BACKGROUND OF THE INVENTION

1. Field of the Invention

The invention relates to an air electrode for a metal-air battery, which functions stably both upon oxygen reduction during discharging and upon oxygen generation during charging, a membrane/air electrode assembly that has the air electrode, and to a metal-air battery.

2. Description of Related Art

A metal-air battery is a chargeable/dischargeable battery that utilizes a metal or a metal compound in a negative electrode active material and oxygen in a positive electrode active material. Oxygen, as the positive electrode active material, can be obtained from air, and hence the positive electrode active material need not be sealed in the battery. Therefore, metal-air battery realizes, in theory, a capacity that is greater than that of secondary battery that utilizes solid positive electrode active materials.

In a case where an alkaline electrolyte solution is used, the reaction represented by formula (I) below takes place at the air electrode of a metal-air secondary battery during discharge.

$$O_2 + 2H_2O + 4e^- \rightarrow 4OH^- \quad (I)$$

The $OH^-$ ions generated in the reaction of formula (I) are dissolved in the electrolyte solution.

The reaction represented by formula (II) takes place at the air electrode during charging.

$$4OH^- \rightarrow O_2 + 2H_2O + 4e^- \quad (II)$$

The $O_2$ gas generated in the reaction of formula (II) diffuses out of a cell.

The reaction of formula (I) is believed to take place at so-called three-phase boundary at which three phases come into contact, namely oxygen as a reactant, the air electrode catalyst, and an ion-conducting phase. Accordingly, three-phase boundary may be formed in significant numbers in order to promote the reaction.

Recent years an active ongoing research relating to metal-air secondary battery that employs alkaline electrolyte solutions has taken place. If an alkaline electrolyte solution is used, the latter absorbs readily carbon dioxide present in air. Absorption of carbon dioxide impairs the performance of the electrolyte solution and causes precipitation of carbonate salts of metal ions, all of which is problematic. In order to avert the above problem, Naoko FUJIWARA "Kinzoku-kuki nijinidenchiyo kagyaku kukikyoku no kaihatsu" (Development of Reversible Air Electrode for Metal-Air Secondary Battery (Electrochemistry, 78 (2010) 540-544)) proposes an electrode structure where a layer of an anion-exchange membrane is provided between an air electrode and an alkaline electrolyte solution. The anion-exchange membrane is a polymer membrane that selectively lets anions through, such that the membrane suppresses migration of metal ions in the electrolyte solution towards the air electrode, and dissolution of carbon dioxide from air into the electrolyte solution, without hampering the reactions of formulas (I) and (II).

Naoko FUJIWARA "Kinzoku-kuki nijinidenchiyo kagyaku kukikyoku no kaihatsu" (Development of Reversible Air Electrode for Metal-Air Secondary Battery (Electrochemistry, 78 (2010) 540-544)) studies the feature of nullifying the influence of carbon dioxide through contact with an anion-exchange membrane in an air electrode that uses a noble metal catalyst. In such an electrode structure, however, the air electrode is not in direct contact with the electrolyte solution, and hence three-phase boundaries do not form readily in a catalyst layer.

SUMMARY OF THE INVENTION

The invention provides an air electrode for a metal-air battery, a membrane/air electrode assembly for a metal-air battery that has the air electrode, and to a metal-air battery, which function stably both upon oxygen reduction during discharge and upon oxygen generation during charging.

A first aspect of the invention relates to an air electrode for a metal-air battery. The air electrode for a metal-air battery contains an air electrode catalyst, an electrolyte for air electrodes and a conductive material. The electrolyte for air electrodes contains a layered double hydroxide.

In the aspect above, the layered double hydroxide may have at least one type of divalent metal ion and at least one type of trivalent metal ion.

In the aspect above, the layered double hydroxide may have a higher-order structure, in which a plate-like crystal has a two-dimensional regular arrangement of double hydroxide having the metal ions, the plate crystal stacked in two or more layers.

In the aspect above, the layered double hydroxide may have a property by which anions are taken up between the layers.

In the aspect above, the layered double hydroxide may be at least one layered double hydroxide selected from the group consisting of a magnesium-aluminum double hydroxide, a nickel-aluminum double hydroxide, and a cobalt-aluminum double hydroxide.

In the aspect above, the air electrode catalyst may be a complex oxide having at least one metal element selected from the group consisting of iron, cobalt, nickel, titanium, manganese and copper, and having at least one structure selected from the group consisting of a perovskite structure, a spinel structure and a pyrochlore structure.

In the aspect above, the layer thickness of the electrolyte for air electrodes may range from 0.5 μm to 500 μm.

In the aspect above, the layer thickness of the electrolyte for air electrodes may range from 1 μm to 200 μm.

A second aspect of the invention relates to a membrane/air electrode assembly for a metal air-battery. The membrane/air electrode assembly for a metal-air battery has an anion-exchange membrane and the air electrode for a metal-air battery according to the first aspect. The air electrode is disposed on one face of the anion-exchange membrane.

In the aspect above, the membrane/air electrode assembly for a metal-air battery may further have a current collector disposed on a face of the air electrode that is different from the face at which the anion-exchange membrane is disposed.

In the aspect above, the membrane/air electrode assembly for a metal-air battery may further have a gas diffusion layer disposed between the air electrode and the current collector.

A third aspect of the invention relates to a metal-air battery. The metal-air battery has the air electrode according to the first aspect, a negative electrode, and an electrolyte solution layer interposed between the air electrode and the negative electrode.

In the aspect above, the metal-air battery may further have an anion-exchange membrane interposed between the air electrode and the electrolyte solution layer.

By virtue of the abovementioned aspects, the air electrode for a metal-air battery exhibits greater oxidation resistance, and does not deteriorate readily, even when exposed to harsh environments. Accordingly, charge and discharge can be carried out stably, not only for the oxygen reduction reaction but also for the oxygen generation reaction. In the aspects above, a layered double hydroxide having a regular layer configuration is used as the electrolyte for air electrodes. This allows, as a result, maintaining anion conduction pathways between the layers and in the vicinity of the surface of the layers. The abovementioned aspects afford better water wettability and greater rigidity than in the case of conventional air electrode for a metal-air battery. The three-phase boundaries that are formed can be expected to be preserved, as they do not deform readily on account of pressure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF AN EMBODIMENT

An air electrode for a metal-air battery according to an embodiment of the invention contains an air electrode catalyst, an electrolyte for air electrodes and a conductive material, where the electrolyte for air electrodes contains a layered double hydroxide.

Metal-air battery that employs alkaline aqueous solutions as electrolyte solutions has been the object of active research in recent years. As described above, a configuration has been proposed, for a metal-air battery that uses an alkaline aqueous solution as an electrolyte solution, where an anion-exchange membrane is disposed between an air electrode and the electrolyte solution, with a view to preventing intrusion of air, mainly, and with a view to protecting the electrolyte solution and a negative electrode active material. However, arranging thus an anion-exchange membrane between an air electrode and an electrolyte solution precludes permeation of a sufficient amount of electrolyte solution towards the air electrode side. As a result, anion conductivity in the air electrode becomes insufficient and three-phase boundaries do not form readily. The inventors have found that an air electrode for a metal-air battery that functions stably, also upon oxygen reduction during discharge and upon oxygen generation during charging, can be obtained by incorporating a layered double hydroxide, as an electrolyte, in the air electrode.

The air electrode for a metal-air battery according to an embodiment of the invention has an air electrode catalyst layer and a gas diffusion layer, and, in addition, has a current collector and an air electrode lead connected to the current collector.

(Air Electrode Catalyst Layer)

The air electrode catalyst layer used in an embodiment of the invention contains an air electrode catalyst, and a layered double hydroxide that is used as an electrolyte for air electrodes. The air electrode catalyst layer may further contain a binder, as the case may require.

In an embodiment of the invention, the double hydroxide denotes a higher-order compound resulting from compositing two types (or three or more types) of metal hydroxide. In an embodiment of the invention, the layered double hydroxide used as the electrolyte for air electrodes is a higher-order compound in which a plate crystal has a two-dimensional spread through regular arrangement of a double hydroxide having the metal ion, the plate crystal being stacked in two or more layers.

The layered double hydroxide, specifically, may be a non-stoichiometric compound represented by formula $[M^{2+}_{1-x}M^{3+}_x(OH)_2][A^{n-}_{x/n} \cdot yH_2O]$ (where x is a real number that satisfies $0 < x < 1$; y is a real number; $M^{2+}$ is a divalent metal ion such as $Mg^{2+}$, $Fe^{2+}$, $Zn^{2+}$, $Ca^{2+}$, $Li^{2+}$, $Ni^{2+}$, $Co^{2+}$ or $Cu^{2+}$; $M^{3+}$ is a trivalent metal ion such as $Al^{3+}$, $Fe^{3+}$, $Mn^{3+}$ or $Co^{3+}$; and $A^{n-}$ is a counter anion such as a nitrate ion, a carbonate ion, a chloride ion or the like). The layered double hydroxide has a property whereby anions are taken up (intercalated) between the layers. In the layered structure, the hydroxide base layers have positive charge through replacement (solid solution) of some of the divalent metal ions by trivalent metal ions. To compensate for this charge, and to maintain thereby electric neutrality, anions are taken up into the interlayer.

In the above example, the layered double hydroxide has one type of divalent metal ion and one type of trivalent metal ion, but the layered double hydroxide that is used in an embodiment of the invention is not necessarily limited to that example alone. For instance, the layered double hydroxide may have one type of monovalent metal ion and one type of divalent metal ion, or one type of divalent metal ion and two types of tetravalent metal ions. That is, a layered double hydroxide can be used as the layered double hydroxide of an embodiment of the invention, so long as the layered double hydroxide has one or more types of metal ions respectively having dissimilar valences. The layered double hydroxide may have metal ions of a same element, if the valences of the ions are mutually dissimilar.

Layered double hydroxides exhibit differences depending on the constituent materials, but ordinarily have an average particle size ranging from the order of 0.1 µm to several µm, and spacing between layers of the order of nm (nanometer). In an embodiment of the invention there is used an electrolyte for air electrodes in the form of a layered double hydroxide that is a micron-scale inorganic compound. As a result, more three-phase boundaries are formed than in the case of an air electrode for a metal-air battery that contains no ion-conducting substance. Also, the air electrode for a metal-air battery of an embodiment of the invention exhibits better water wettability and greater rigidity than an air electrode for a metal-air battery. The three-phase boundaries that are formed can be expected to be preserved, as they do not deform readily on account of pressure.

The air electrode for a metal-air battery of an embodiment of the invention exhibits better oxidation resistance than an air electrode for a metal-air battery, and is hence expected to be less likely to deteriorate, even when exposed to harsh environments.

The layered double hydroxide used in an embodiment of the invention may have at least one type of divalent metal ion and at least one type of trivalent metal ion. The layered double hydroxide used in an embodiment of the invention may be a magnesium-aluminum double hydroxide $[Mg^{2+}_{1-x}Al^{3+}_{x}(OH)_2][A^{n-}_{x/n} \cdot yH_2O]$ (where x is a real number that satisfies $0<x<1$, y is a real number and $A^{n-}$ is a counter anion such as a nitrate ion, a carbonate ion, a chloride ion or the like), or may be a nickel-aluminum double hydroxide $[Ni^{2+}_{1-x}Al^{3+}_{x}(OH)_2][A^{n-}_{x/n} \cdot yH_2O]$, (where x is a real number that satisfies $0<x<1$, y is a real number and $A^{n-}$ is a counter anion such as a nitrate ion, a carbonate ion, a chloride ion or the like). Other examples of the layered double hydroxide include, for instance, a cobalt (II)-cobalt (III) double hydroxide, an iron (II)-iron (III) double hydroxide, a cobalt-iron double hydroxide, a cobalt-aluminum double hydroxide or the like.

As the air electrode catalyst used in an embodiment of the invention there can be used a complex oxide having at least one metal element selected from among iron, cobalt, nickel, titanium, manganese and copper, and having at least one structure selected from the group consisting of a perovskite structure, a spinel structure and a pyrochlore structure. Conventionally, some of these oxides have high activity in both the oxygen reduction reaction, which is the discharge reaction in the air electrode, and an oxygen generation reaction, which is the charging reaction. The below-described metal-air battery according to an embodiment of the invention uses an alkaline electrolyte solution, and hence the abovementioned oxides can be used as the air electrode catalyst. Alternatively, an ordinary oxygen activating catalyst can be used as the air electrode catalyst. Examples of oxygen activating catalysts include, for instance, platinum-group metals such as nickel, palladium and platinum; perovskite-type oxides that have a transition metal such as cobalt, manganese or iron; inorganic compounds that have a noble metal oxide such as ruthenium, iridium or palladium; metal coordination organic compounds having a porphyrin skeleton or a phthalocyanine skeleton; as well as manganese oxide and the like. In terms of making the electrode reaction smoother, the air electrode catalyst may be itself highly conductive, or may be supported on a below-described conductive material.

The conductive material that is used in the air electrode catalyst layer is not particularly limited, so long as the material has conductivity. Examples thereof include, for instance, a carbon material, a perovskite-type conductive material, a porous conductive polymer, a metal porous body or the like. The carbon material may have a porous structure, or may lack a porous structure. Specific examples of carbon materials having a porous structure include, for instance, mesoporous carbon. Specific examples of carbon materials lacking a porous structure include, for instance, graphite, acetylene black, carbon nanotubes and carbon fibers.

The abovementioned air electrode catalyst layer need only contain at least the air electrode catalyst and the electrolyte for air electrodes, but may further contain a binder. Examples of the binder include, for instance, polyvinylidene fluoride (PVDF), polytetrafluoroethylene (PTFE) or an elastomeric resin such as styrene butadiene rubber (SBR rubber). The content of binder in the air electrode catalyst layer is not particularly limited, but may be, for instance, no greater than 30 wt %, may be a range from 1 wt % to 20 wt %, and further may be a range from 1 wt % to 10 wt %.

The thickness of the abovementioned air electrode catalyst layer varies depending on, for instance, the intended use of the metal-air battery, but may range for instance from 0.5 μm to 500 μm, and from 1 μm to 200 μm within that range.

(Gas Diffusion Layer)

The gas diffusion layer used in an embodiment of the invention has a function of enabling oxygen taken up from the exterior to diffuse into the air electrode catalyst layer, during a discharge reaction, and enabling oxygen generated during the charging reaction to diffuse towards the exterior. At the same time, the gas diffusion layer can function as a collector and support of the air electrode catalyst layer. Through being subjected to a water-repellency treatment, the gas diffusion layer may also be capable of preventing leakage of electrolyte solution from the interior of the battery. The material used in the gas diffusion layer may be carbon, a metal, a conductive ceramic or the like, but ordinarily a porous conductive sheet having carbon is used as the gas diffusion layer.

(Current Collector)

The current collector used in an embodiment of the invention collects power from the air electrode catalyst layer. The material of the current collector is not particularly limited, provided that the material has conductivity. Examples thereof include, for instance, stainless steel, nickel, aluminum, iron, titanium or carbon. The shape of the current collector may be, for instance, foil-like, plate-like or mesh (grid)-like. In an embodiment of the invention, the current collector may have a mesh-like shape, in terms of affording superior collector efficiency and not hampering gas diffusion. The current collector may be disposed so as to be in contact with the gas diffusion layer or air electrode catalyst layer. The air electrode for a metal-air battery according to an embodiment of the invention may be provided with a separate current collector (for instance, a foil-like collector) that collects charge that is collected by the mesh-like current collector. In an embodiment of the invention, the below-described battery case may double as a current collector. The thickness of the current collector may range for instance from 10 μm to 1000 μm, and from 20 μm to 400 μm within that range.

An explanation follows next on a method for producing an air electrode for a metal-air battery that uses a layered double hydroxide as an electrolyte for air electrodes.

Firstly, there is prepared a conductive sheet having the above-described conductive carbon material. Carbon paper, carbon cloth, carbon felt or the like can be used as the conductive sheet. The conductive sheet makes up the above-described gas diffusion layer.

Next, a slurry (hereafter also referred to as catalyst slurry) resulting from mixing, in a solvent, an air electrode catalyst and the layered double hydroxide that is used as the electrolyte for air electrodes, is coated onto one face of the conductive sheet. An oxide or the like that constitutes a catalyst may be used, as-is, as the air electrode catalyst. Alternatively, there can be used an air electrode catalyst in which the oxide or the like that constitutes the catalyst is supported on conductive particles that are a catalyst support.

As the solvent in which the air electrode catalyst and the layered double hydroxide are mixed together there can be used water, or an organic solvent such as glycerin, methanol, ethanol, 2-propanol or the like, or an aqueous solution of the foregoing. A dispersant, binder and so forth may be appropriately mixed into the catalyst slurry.

Examples of methods for coating the catalyst slurry onto the conductive sheet include, for instance, a method in which the catalyst slurry is coated onto the conductive sheet thinly and uniformly by means of a spatula or the like, or a method in which the catalyst slurry is coated onto the conductive sheet by spraying. The catalyst slurry is coated onto one face of the conductive sheet, followed by drying as the case may require, and then the current collector is disposed on the face of the conductive sheet on the side opposite to that coated with the catalyst slurry. The air electrode for a metal-air battery of the invention is completed thereby.

The membrane/air electrode assembly for a metal-air battery according to an embodiment of the invention has the anion-exchange membrane and the abovementioned air electrode for a metal-air battery, such that the air electrode is disposed on one face of the anion-exchange membrane.

Examples of the anion-exchange membrane that can be used in an embodiment of the invention include, for instance, an anion-exchange membrane (A-201, by Tokuyama), but the anion-exchange membrane is not limited thereto. The layer configuration of the membrane/air electrode assembly for a metal-air battery according to an embodiment of the invention may be, for instance, a three-layer structure in which the anion-exchange membrane, the air electrode catalyst layer, and the current collector are stacked in this order. In a case where the air electrode further has a gas diffusion layer, the layer configuration may be, for instance, a four-layer structure in which the anion-exchange membrane-air electrode catalyst layer-gas diffusion layer-current collector are stacked in this order.

The method for producing the membrane/air electrode assembly for a metal-air battery according to an embodiment of the invention is not particularly limited, so long as the above-described air electrode for a metal-air battery is formed on one face of the anion-exchange membrane. Specifically, the anion-exchange membrane may be bonded to the air electrode catalyst layer side of the above-described air electrode for a metal-air battery, or, alternatively, the above-described catalyst slurry may be coated onto one face of the anion-exchange membrane, followed by drying, to form the air electrode catalyst layer on the surface of the anion-exchange membrane, after which the gas diffusion layer and the current collector are sequentially bonded onto the face on the air electrode catalyst layer side. Alternatively, a transfer sheet may be produced by coating the above-described catalyst slurry onto the surface of a transfer substrate, followed by drying, and the transfer sheet may be bonded then, for instance by thermal compression bonding, to the anion-exchange membrane, after which a substrate film of the transfer sheet is stripped off. In this method, the air electrode catalyst layer is formed on the surface of the anion-exchange membrane, and the gas diffusion layer and the current collector are sequentially formed on the face on the air electrode catalyst layer side.

A metal-air battery according to an embodiment of the invention is a metal-air battery that has at least an air electrode, a negative electrode, and an electrolyte solution layer interposed between the air electrode and the negative electrode, where the air electrode is the abovementioned air electrode for a metal-air battery.

Figure 1:
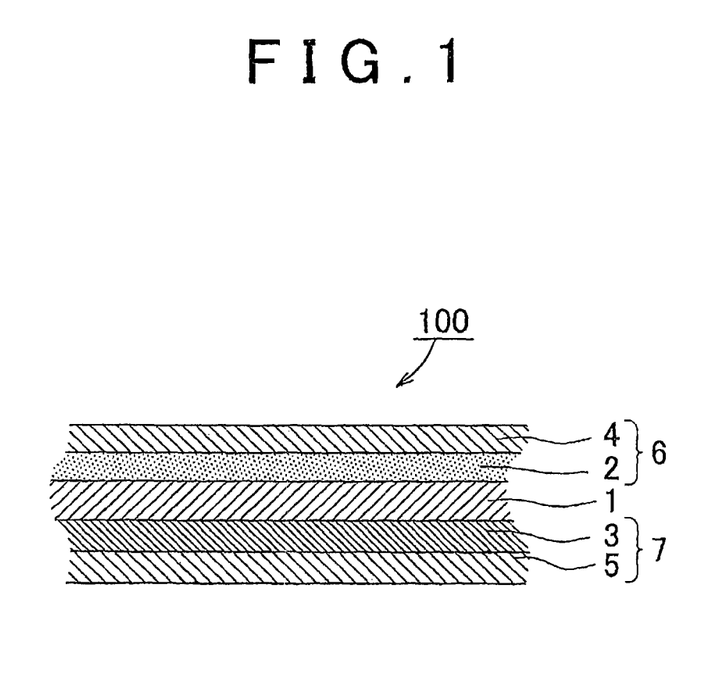
FIG. 1 is a diagram illustrating an example of a layer configuration of a metal-air battery according to an embodiment of the invention, depicting schematically a cross section, in the stacking direction, of the layers of the metal-air battery.

FIG. 1 is a diagram illustrating an example of a layer configuration of a metal-air battery according to an embodiment of the invention, depicting schematically a cross section, in the stacking direction, of the layers of the metal-air battery. The metal-air battery according to an embodiment of the invention is not necessarily limited to this example alone. A metal-air battery 100 has: an air electrode 6 that has an air electrode catalyst layer 2 and a current collector 4; a negative electrode 7 that has a negative electrode active material layer 3 and a negative electrode collector 5; and an electrolyte solution layer 1 sandwiched between the air electrode 6 and the negative electrode 7. The air electrode in the metal-air battery according to an embodiment of the invention is as described above. The above-described anion-exchange membrane may be further interposed between the air electrode and the electrolyte solution layer.

A detailed explanation follows next on the negative electrode and electrolyte solution layer, as other constituent elements of the metal-air battery according to an embodiment of the invention, and on a separator and a battery case that are used in an embodiment of the invention.

(Negative Electrode)

The negative electrode in the metal-air battery according to an embodiment of the invention has a negative electrode layer that contains a negative electrode active material. In addition, the negative electrode ordinarily has a negative electrode collector, and a negative electrode lead connected to the negative electrode collector.

(Negative Electrode Layer)

The negative electrode layer in the metal-air battery according to an embodiment of the invention contains a negative electrode active material that has a metal and an alloy material. Specific examples of the metal and alloy material that can be used in the negative electrode active material include, for instance, alkaline metals such as lithium, sodium and potassium; group 2 elements such as magnesium and calcium; group 13 elements such as aluminum or the like; transition metals such as zinc, iron or the like; as well as compounds and/or alloy materials containing the foregoing metals. Examples of alloys having lithium include, for instance, lithium-aluminum alloys, lithium-tin alloys, lithium-lead alloys, lithium-silicon alloys and the like. Examples of metal oxides containing lithium include, for instance, lithium titanium oxide. Examples of metal nitrides containing lithium include, for instance, lithium cobalt nitride, lithium iron nitride and lithium manganese nitride. Lithium coated with a solid electrolyte can also be used in the negative electrode layer.

The abovementioned negative electrode layer may contain a negative electrode active material alone, or may contain, in addition to the negative electrode active material, at least one from among a conductive material and a binder. In a case where, for instance, the negative electrode active material is foil-like, the negative electrode layer may contain the negative electrode active material alone. In a case where the negative electrode active material is powdery, the negative electrode layer may have a negative electrode active material and a binder. Features regarding the conductive material and the binder are identical to those described in the section "air electrode catalyst layer" above, and hence a recurrent explanation thereof will be omitted.

(Negative Electrode Collector)

The material used in the negative electrode collector of the metal-air battery according to an embodiment of the invention is not particularly limited, so long as the material is conductive. Examples thereof include, for instance, copper, stainless steel, nickel, carbon or the like. The shape of the abovementioned negative electrode collector may be, for instance, foil-like, plate-like or mesh (grid)-like. In the invention, a below-described battery case may double as a negative electrode collector.

(Electrolyte Solution Layer)

The electrolyte solution that can be used in the electrolyte solution layer in the metal-air battery according to an embodiment of the invention is formed between the air electrode catalyst layer and the negative electrode layer, and supports conduction of hydroxide ions (OH⁻). Examples of alkaline electrolyte solution that can be used include, for instance, an aqueous electrolyte solution and a nonaqueous electrolyte solution. For instance, a solution resulting from incorporating a lithium salt into water is ordinarily used as the aqueous electrolyte solution that can be used in lithium air battery, from among metal-air batteries. Examples of lithium salts include, for instance, inorganic lithium salts such as LiOH, $LiPF_6$, $LiBF_4$, $LiClO_4$ or $LiAsF_6$ or organic lithium salts such as $LiCF_3SO_3$, $LiN(SO_2CF_3)_2$(Li-TFSI), $LiN(SO_2C_2F_5)_2$ or $LiC(SO_2CF_3)_3$. The concentration of LiOH in the aqueous electrolyte solution is set to range from 0 M to 5.12 M, where 5.12 M is the saturation concentration at room temperature. Lithium ion conductivity drops significantly at an electrolyte concentration below 0.1 M. Accordingly, about 0.1 M to 12 M KOH or NaOH can be added separately in order to compensate for the operation at this LiOH concentration region.

As the aqueous electrolyte solution there can be used, in addition to the above-described ones, a potassium hydroxide (KOH) aqueous solution or a sodium hydroxide (NaOH) aqueous solution. In an embodiment of the invention, the aqueous electrolyte solution may contain, for instance, a low-volatility liquid such as an ionic liquid.

A nonaqueous electrolyte solution that can be used in, for instance, a lithium air battery from among metal-air batteries, contains ordinarily the above-described lithium salt and a nonaqueous solvent. Examples of the non-aqueous solvent include, for instance, ethylene carbonate (EC), propylene carbonate (PC), dimethyl carbonate (DMC), diethyl carbonate (DEC), ethyl methyl carbonate (EMC), ethyl carbonate, butylene carbonate, γ-butyrolactone, sulfolane, acetonitrile, 1,2-dimethoxyethane, 1,3-dimethoxypropane, diethyl ether, tetrahydrofuran, 2-methyl tetrahydrofuran, as well as mixtures of the foregoing. In terms of ability of reacting effectively with dissolved oxygen, the non-aqueous solvent may have high oxygen solubility. The concentration of lithium salt in the non-aqueous electrolyte solution ranges for instance from 0.5 mol/L to 3 mol/L.

(Separator)

A separator can be provided in part of the battery according to an embodiment of the invention. Examples of the above-mentioned separator include, for instance, a porous film of polyethylene, polypropylene or the like, or a nonwoven fabric such as a resin nonwoven fabric or a glass-fiber nonwoven fabric.

(Battery Case)

The metal-air battery according to the invention has ordinarily a battery case that houses the air electrode, the negative electrode and the electrolyte solution layer. Specific examples of the form of the battery case include, for instance, coin forms, flat-plate forms, tubular forms, laminate forms and the like. The battery case may be an open-to-air battery case, or may be a sealed battery case. An open-to-air battery case is a battery case having structure where at least the air electrode can come into sufficient contact with the atmosphere. If the battery case is a sealed battery case, preferably, a gas (air) introduction tube and venting tube are preferably provided in the sealed battery case. Herein, the gas that is introduced and vented may have a high oxygen concentration, and may be pure oxygen. The oxygen concentration may be raised during discharge, and lowered during charging.

Specific aspects of the invention are explained in further detail below based on examples. Within the scope of the invention, however, the latter is not limited to these examples.

EXAMPLE 1

A detailed explanation follows next on a method for producing a membrane/air electrode assembly for a metal-air battery that uses a magnesium-aluminum layered double hydroxide (hereafter also referred to as MgAl layered double hydroxide).

Preparation of an MgAl Layered Double Hydroxide

A layered double hydroxide can be produced in accordance with an available method, such as the one set forth in N. Iyi, T. Matsumoto, Y. Kaneko, K. Kitamura, Chem. Lett., 33, 1122 (2004). A method will be explained next that refers to the production method of the above document. Herein, 5.13 g (20 mmol) of nitrate magnesium hexahydrate (Mg $(NO_3)_2.6H_2O$), 3.75 g (10 mmol) of nitrate aluminum non-ahydrate ($Al(NO_3)_3.9H_2O$) and 3.64 g (26 mmol) of hexamethylenetetramine were dissolved in 80 mL of pure water. The resulting solution was sealed in a pressure vessel for autoclaves, and was heated in an autoclave at 140° C. for 24 hours. Thereafter, the content in the pressure vessel was filtered, was washed with water and was vacuum-dried for 24 hours, to yield crystals of MgAl layered double hydroxide ($[Mg^{2+}_{1-x} Al^{3+}_x(OH)_2][NO^{3-}_{x/3}.yH_2O]$ (where x is a real number satisfying 0<x<1, and y is a real number)).

Production of an Air Electrode Catalyst

An oxide having a composition $La_{0.7}Sr_{0.3}CoO_3$ and a perovskite-type crystal structure was prepared as the air electrode catalyst. Herein, $La_{0.7}Sr_{0.3}CoO_3$ was produced as described below. Firstly, lanthanum nitrate hexahydrate ($La(NO_3)_3.6H_2O$), strontium nitrate ($Sr(NO_3)_2$) and cobalt nitrate hexahydrate ($Co(NO_3)_2.6H_2O$), as a La source, a Sr source and a Co source, respectively, were mixed in predetermined ratios to yield a 0.05 mol/L nitrate aqueous solution. Next, this solution was dropped onto an aqueous solution resulting from adding 0.03 mol/L potassium tetrapropylammonium to 0.5 mol/L potassium hydroxide. The obtained hydroxide precipitate was filtered off, was dried, and was then fired at 700° C. for 5 hours. The obtained fired product was pulverized to yield a $La_{0.7}Sr_{0.3}CoO_3$ powder.

Production of a Membrane/Air Electrode Assembly for a Metal-Air Battery

A catalyst slurry was prepared by mixing the abovementioned $La_{0.7}Sr_{0.3}CoO_3$ powder used as the air electrode catalyst, the abovementioned MgAl layered double hydroxide used as the electrolyte for air electrodes, a Teflon (trademark) dispersion (Du Pont (USA, 60% dispersion)) used as the binder, plus an appropriate amount of water and a commercially available dispersant (Triton X-100 (trademark)). The catalyst slurry was prepared in such a manner that the ratio of the air electrode catalyst, the electrolyte for air electrodes and the binder was $La_{0.7}Sr_{0.3}CoO_3$:MgAl layered double hydroxide:Teflon (trademark)=88.2:9.8:2. That is, the content of MgAl layered double hydroxide was set to 10 wt % with respect to 100 wt % as the total weight of $La_{0.7}Sr_{0.3}CoO_3$ plus MgAl layered double hydroxide. Commercially available carbon paper (SIGRACET (trademark) GDL-10BC, by SGL Group) was used as the conductive material doubling as a gas diffusion layer. The abovementioned catalyst slurry was coated onto one face of carbon paper, to a coating amount of $La_{0.7}Sr_{0.3}CoO_3$ of 1 mg/cm². Thereafter, the solvent was removed through air drying, and when appropriate, by heat drying under reduced pressure. Lastly, an anion-exchange membrane (A-201, by Tokuyama) was pressure-bonded to the face of the carbon paper coated with the catalyst slurry, and a nickel mesh, as the current collector, was affixed to the other face, to yield a membrane/air electrode assembly for a metal-air battery of Example 1.

EXAMPLE 2

A membrane/air electrode assembly for a metal-air battery of Example 2 was produced in the same way as in Example 1, but herein the catalyst slurry was prepared in such a manner that the weight ratios of the air electrode catalyst, electrolyte for air electrodes and binder set forth in Example 1 were $La_{0.7}Sr_{0.3}CoO_3$:MgAl layered double hydroxide:Teflon (trademark)=78:4:19.6:2. That is, the content of MgAl layered double hydroxide in the Example 2 was set to 20 wt % with respect to 100 wt % as the total weight of $La_{0.7}Sr_{0.3}CoO_3$ plus MgAl layered double hydroxide.

Preparation of a Membrane/Air Electrode Assembly for a Metal-Air Battery that Uses a Nickel-Aluminum Layered Double Hydroxide (Hereafter Also Referred to as NiAl Layered Double Hydroxide

EXAMPLE 3

1-2-1

Preparation of a NiAl Layered Double Hydroxide

A solution resulting from dissolving 1.19 g (5 mmol) of nickel chloride hexahydrate ($NiCl_2.6H_2O$), 0.333 g (2.5 mmol) of aluminum chloride ($AlCl_3$) and 0.45 g (7.5 mmol) of urea in 50 mL of pure water was sealed in a pressure vessel for autoclaves, and was heated in an autoclave at 190° C. for 48 hours. Thereafter, the content in the pressure vessel was filtered, was washed with water and was vacuum-dried for 24 hours, to yield crystals of a NiAl layered double hydroxide $([Ni^{2+}_{1-x}Al^{3+}_x(OH)_2][Cl^-_x.yH_2O]$ (where x is a real number satisfying 0<x<1, and y is a real number)).

EXAMPLE 3

The above-described $La_{0.7}Sr_{0.3}CoO_3$ powder in Example 1 was used. A catalyst slurry was prepared by mixing the abovementioned $La_{0.7}Sr_{0.3}CoO_3$ powder used as the air electrode catalyst, the abovementioned NiAl layered double hydroxide used as the electrolyte for air electrodes, a Teflon (trademark) dispersion (Du Pont (USA, 60% dispersion)) used as the binder, plus an appropriate amount of water and a commercially available dispersant (Triton X-100 (trademark)). The catalyst slurry was prepared in such a manner that the ratio of the air electrode catalyst, the electrolyte for air electrodes and the binder was $La_{0.7}Sr_{0.3}CoO_3$:NiAl layered double hydroxide:Teflon (trademark)=88.2:9.8:2. That is, the content of NiAl layered double hydroxide was set to 10 wt % with respect to 100 wt % as the total weight of $La_{0.7}Sr_{0.3}CoO_3$ plus NiAl layered double hydroxide. In the same way as in Example 1, the abovementioned catalyst slurry was coated onto one face of carbon paper, followed by drying and healing, after which an anion-exchange membrane (A-201, by Tokuyama) was pressure-bonded to a face coated by the catalyst slurry, and a nickel mesh, as the current collector, was affixed to the other face, to yield a membrane/air electrode assembly for a metal-air battery of Example 3.

EXAMPLE 4

A membrane/air electrode assembly for a metal-air battery of Example 4 was produced in the same way as in Example 3, but herein the catalyst slurry was prepared in such a manner that the weight ratios of the air electrode catalyst, electrolyte for air electrodes and binder set forth in Example 3 were $La_{0.7}Sr_{0.3}CoO_3$:NiAl layered double hydroxide:Teflon (trademark)=78.4:19.6:2. That is, the content of NiAl layered double hydroxide in the Example 4 was set to 20 wt % with respect to 100 wt % as the total weight of $La_{0.7}Sr_{0.3}CoO_3$ plus NiAl layered double hydroxide.

COMPARATIVE EXAMPLE 1

A catalyst slurry was prepared by mixing the abovementioned $La_{0.7}Sr_{0.3}CoO_3$ powder used as an air electrode catalyst, and a Teflon (trademark) dispersion (Du Pont (USA, 60% dispersion) used as a binder, plus an appropriate amount of water and a commercially available dispersant (Triton X-100(trademark)). Also, a catalyst slurry was prepared such that the weight ratio of air electrode catalyst and binder, $La_{0.7}Sr_{0.3}CoO_3$:Teflon (trademark) was 98:2. That is, no layered double hydroxide was used in the catalyst slurry in the comparative example. Commercially available carbon paper (SIGRACET (trademark) GDL-10BC, by SGL Group) was used as the conductive material doubling as a gas diffusion layer. The abovementioned catalyst slurry was coated onto one face of carbon paper, to a coating amount of $La_{0.7}Sr_{0.3}CoO_3$ of 1 $mg/cm^2$. Thereafter, the solvent was removed through air drying, and when appropriate, by heat drying under reduced pressure. Lastly, an anion-exchange membrane (A-201, by Tokuyama) was pressure-bonded to the face of the carbon paper coated with the catalyst slurry, and a nickel mesh, as the current collector, was affixed to the other face, to yield a membrane/air electrode assembly for a metal-air battery of Comparative example 1.

Figure 2:
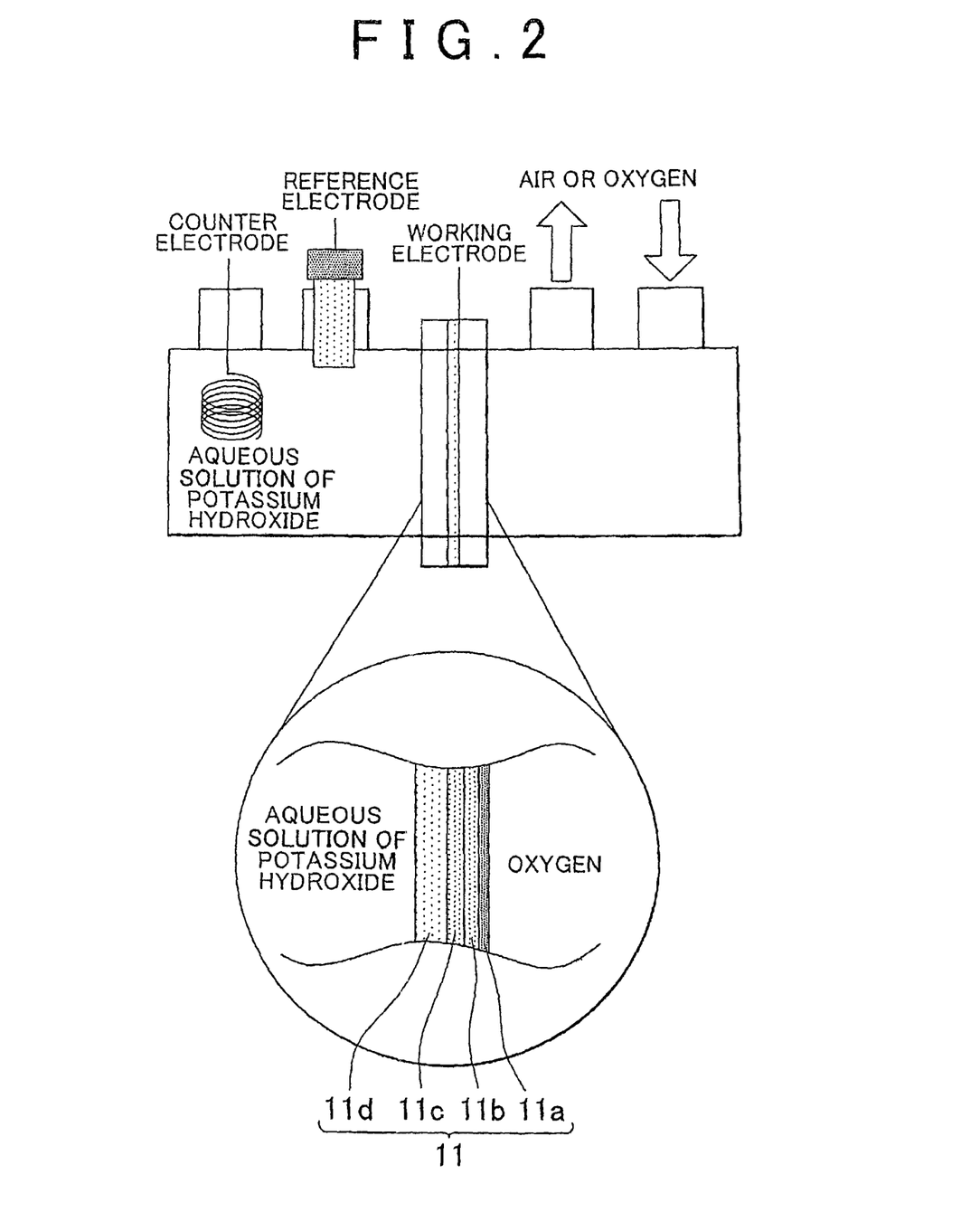
FIG. 2 is a cross-sectional schematic diagram of a two-chamber cell that is used for performance evaluation of membrane/air electrode assemblies for a metal-air battery of Examples 1 to 4 and Comparative example 1.

Evaluation of the Performance of the Membrane/Air Electrode Assemblies for a Metal-Air Battery An oxygen reduction reaction and an oxygen generation reaction of a membrane/air electrode assembly for a metal-air battery were studied in detail for an electrode surface area of 3.14 $cm^2$, using a two-chamber cell. FIG. 2 is a cross-sectional schematic diagram of a two-chamber cell that is used for performance evaluation of membrane/air electrode assemblies for a metal-air battery of Examples 1 to 4 and Comparative example 1. The circle at the bottom of the figure is an enlarged cross-sectional schematic diagram of the configuration in the vicinity of the assembly sandwiched in the two-chamber cell. The measurement was performed using the membrane/air electrode assembly for a metal-air battery, as a working electrode, sandwiched between the two chambers of the cell. More specifically, a membrane/air electrode assembly for a metal-air battery 11 having a current collector 11a, water-repelling carbon paper 11b, an air electrode catalyst layer 11c and an anion-exchange membrane 11d, was disposed in such a manner that the current collector 11a was on the right-side cathode chamber and the anion-exchange membrane 11d was on the left-side anode chamber, facing each other, as illustrated in the figure. Air or oxygen was supplied, at a rate of 50 mL/minute, to the cathode chamber on the right of the figure. The anode chamber on the left of the figure was filled with an aqueous solution of potassium hydroxide. A counter electrode and a reference electrode were also provided. The current-potential characteristic of the membrane/air electrode assemblies for a metal-air battery of Examples 1 to 4 and Comparative example 1 were measured by measuring the potential of the air electrode, under passage of constant current of a definite period of time, using the two-chamber cell. The measurement temperature was 50° C. The electrode potential is notated hereafter in terms of a reversible hydrogen electrode potential. The left side cell of the two-chamber cell is filled with an 8 mol/L aqueous solution of potassium hydroxide (KOHaq). The two-chamber cell has a platinum-wire counter electrode and a mercury oxide electrode as a reference electrode.

Figure 3A:
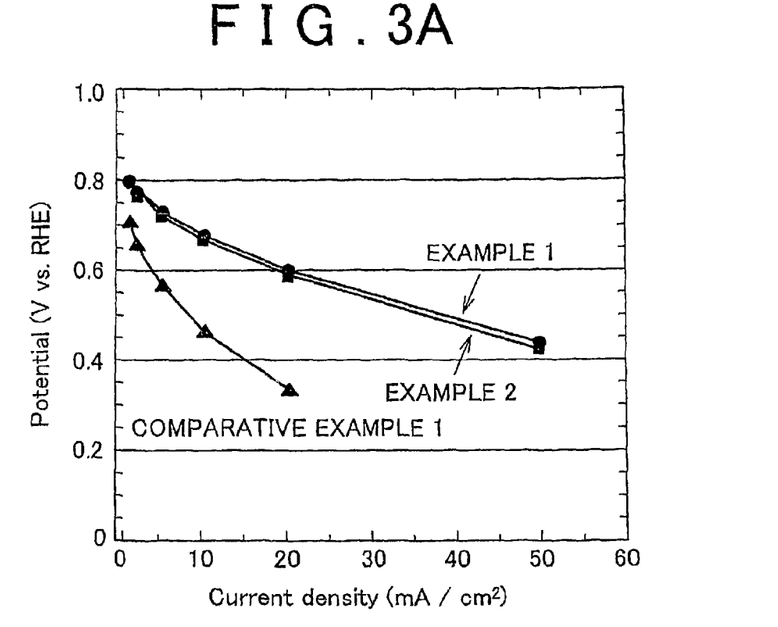
FIG. 3A is a graph illustrating a current-potential characteristic of an oxygen reduction reaction in an air electrode of the membrane/air electrode assemblies for a metal-air battery of Examples 1 and 2 and Comparative example 1.
Figure 3B:
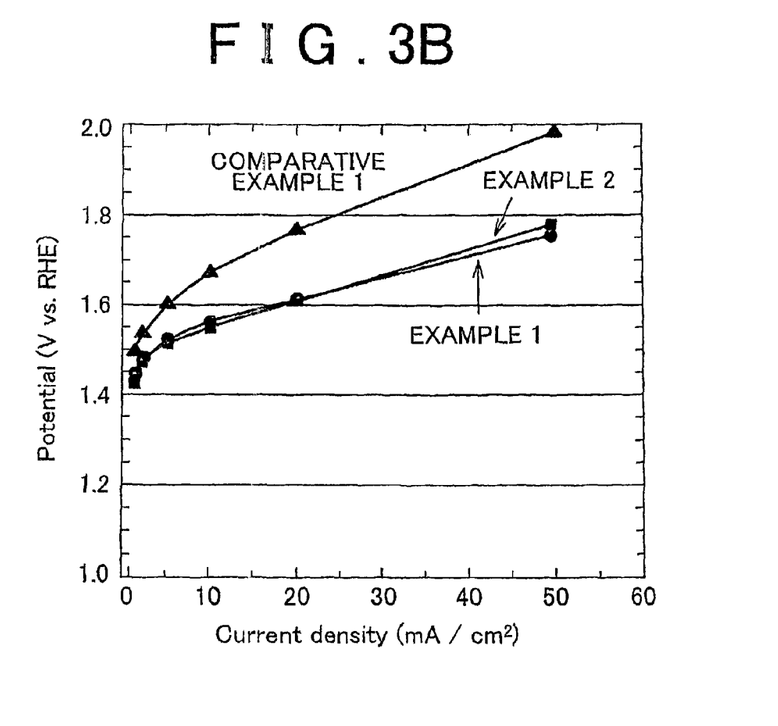
FIG. 3B is a graph illustrating a current-potential characteristic of an oxygen generation reaction in an air electrode of the membrane/air electrode assemblies for a metal-air battery of Examples 1 and 2 and Comparative example 1.

FIG. 3A is a graph illustrating a current-potential characteristic of an oxygen reduction reaction in the air electrode of the membrane/air electrode assemblies for a metal-air battery of Examples 1 and 2 and Comparative example 1. The potential of the oxygen reduction reaction of the air electrode in the assemblies of Examples 1 and 2, where the electrode has an MgAl layered double hydroxide, exhibits values that are higher than the potential of the oxygen reduction reaction in the air electrode of the assembly of Comparative example 1, over the entire range of measured current density. FIG. 3B is a graph illustrating a current-potential characteristic of an oxygen generation reaction in the air electrode of the membrane/air electrode assemblies for a metal-air battery of Examples 1 and 2 and Comparative example 1. The potential of the oxygen generation reaction of the air electrode in the assemblies of Examples 1 and 2, where the electrode has an MgAl layered double hydroxide, exhibits values that are lower than the potential of the oxygen generation reaction in the air electrode of the assembly of Comparative example 1, over the entire range of measured current density. The above results indicate that the air electrode in the assemblies of Examples 1 and 2, where the air electrode has a MgAl layered double hydroxide, function stably not only for oxygen reduction but also for oxygen generation. The air electrode can thus be used as an air electrode for a metal-air battery.

Figure 4A:
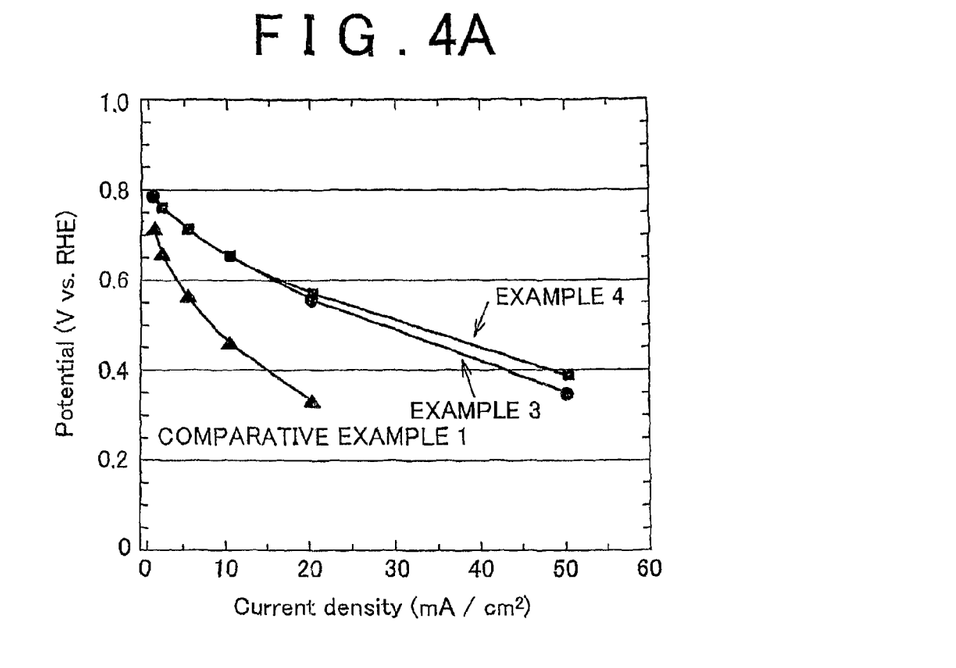
FIG. 4A is a graph illustrating a current-potential characteristic of an oxygen reduction reaction in the air electrode of the membrane/air electrode assemblies for a metal-air battery of Examples 3 and 4 and Comparative example 1.
Figure 4B:
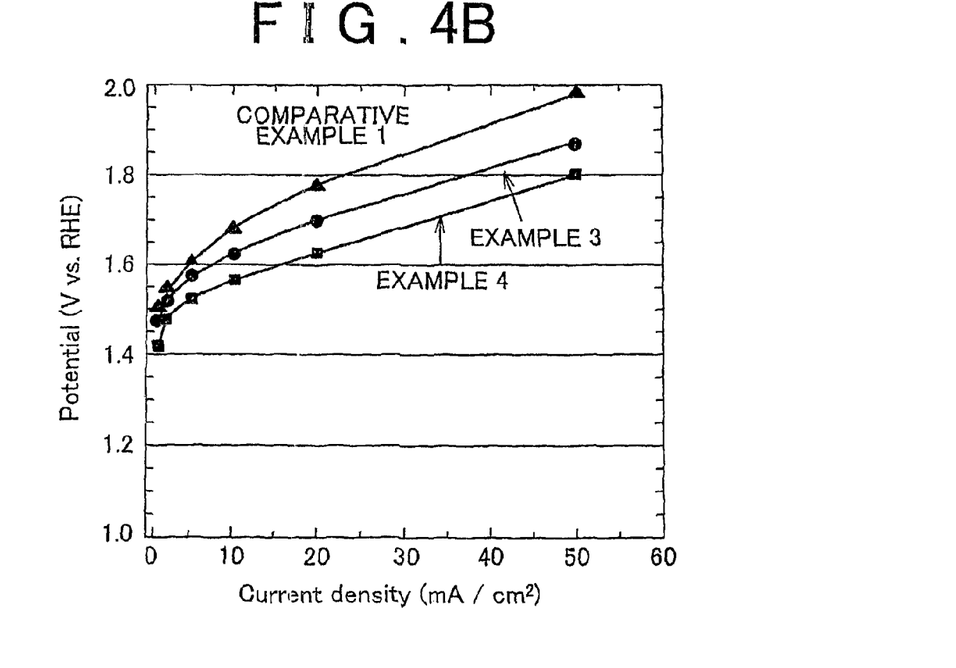
FIG. 4B is a graph illustrating a current-potential characteristic of an oxygen generation reaction in the air electrode of the membrane/air electrode assemblies for a metal-air battery of Examples 3 and 4 and Comparative example 1.

FIG. 4A is a graph illustrating a current-potential characteristic of an oxygen reduction reaction in the air electrode of the membrane/air electrode assemblies for a metal-air battery of Examples 3 and 4 and Comparative example 1. The potential of the oxygen reduction reaction of the air electrode in the assemblies of Examples 3 and 4, where the electrode has a NiAl layered double hydroxide, exhibit values that are higher than the potential of the oxygen reduction reaction in the air electrode of the assembly of Comparative example 1, over the entire range of measured current density. FIG. 4B is a graph illustrating a current-potential characteristic of an oxygen generation reaction in the air electrode of the membrane/air electrode assemblies for a metal-air battery of Examples 3 and 4 and Comparative example 1. The potential of the oxygen generation reaction of the air electrode in the assemblies of Examples 3 and 4, where the electrode has a NiAl layered double hydroxide, exhibits values that are lower than the potential of the oxygen generation reaction in the air electrode of the assembly of Comparative example 1, over the entire range of measured current density. The above results indicate that the air electrode in the assemblies of Examples 3 and 4, where the air electrode has a NiAl layered double hydroxide, functions stably not only for oxygen reduction but also for oxygen generation. The air electrode can thus be used as an air electrode for a metal-air battery.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. An air electrode for a metal-air battery comprising:
   a current collector; and
   an air electrode catalyst layer including:
     an electrolyte for air electrodes; and
     a conductive material,
   wherein:
     the electrolyte for air electrodes contains a layered double hydroxide; and
     the air electrode is in contact with a non-aqueous electrolyte solution layer.

2. The air electrode according to claim 1, wherein the layered double hydroxide has at least one type of divalent metal ion and at least one type of trivalent metal ion.

3. The air electrode according to claim 2, wherein the layered double hydroxide comprises a higher-order structure in which a plate-like crystal has a two-dimensional regular arrangement of double hydroxide having the metal ions, the plate-like crystal stacked in two or more layers.

4. The air electrode according to claim 1, wherein the layered double hydroxide has a property by which anions are taken up between the layers.

5. The air electrode according to claim 1, wherein the layered double hydroxide is at least one layered double hydroxide selected from a group consisting of a magnesium-aluminum double hydroxide, a nickel-aluminum double hydroxide, and a cobalt-aluminum double hydroxide.

6. The air electrode according to claim 1, wherein the air electrode catalyst is a complex oxide having at least one metal element selected from the group consisting of iron, cobalt, nickel, titanium, manganese and copper, and having at least one structure selected from the group consisting of a perovskite structure, a spinel structure and a pyrochlore structure.

7. The air electrode according to claim 1, wherein a layer thickness of the air electrode catalyst layer ranges from 0.5 μm to 500 μm.

8. The air electrode according to claim 7, wherein a layer thickness of the air electrode catalyst layer ranges from 1 μm to 200 μm.

9. A membrane/air electrode assembly comprising:
   an anion-exchange membrane; and
   the air electrode according to claim 1,
   wherein the air electrode is disposed on one face of the anion-exchange membrane.

10. The membrane/air electrode assembly according to claim 9, wherein the current collector is disposed on a face of the air electrode that is different from the face at which the anion-exchange membrane is disposed.

11. The membrane/air electrode assembly according to claim 10, further comprising a gas diffusion layer disposed between the air electrode catalyst layer and the current collector.

12. A metal-air battery, comprising:
   the air electrode according to claim 1;
   a negative electrode; and
   the non-aqueous electrolyte solution layer interposed between the air electrode and the negative electrode.

13. The metal-air battery according to claim 12, further comprising an anion-exchange membrane interposed between the air electrode and the electrolyte solution layer.

14. The air electrode according to claim 1, wherein
   the metal-air battery is a secondary battery; and
   a content of the layered double hydroxide with respect to a total weight of the air electrode catalyst plus the layered double hydroxide is 10 wt % to 20 wt %.

* * * * *